US007177938B2

(12) United States Patent
Sanders (10) Patent No.: US 7,177,938 B2
(45) Date of Patent: *Feb. 13, 2007

(54) CLIENT VERSION ADVERTISEMENT SERVICE FOR OVERRIDING DEFAULT CLIENT VERSION PROPERTIES

(75) Inventor: Scott D. Sanders, Fremont, CA (US)

(73) Assignee: Microsoft Corporation, Redmond, WA (US)

( * ) Notice: Subject to any disclaimer, the term of this patent is extended or adjusted under 35 U.S.C. 154(b) by 26 days.

This patent is subject to a terminal disclaimer.

(21) Appl. No.: 11/178,018

(22) Filed: Jul. 8, 2005

(65) Prior Publication Data
US 2006/0031532 A1 Feb. 9, 2006

Related U.S. Application Data

(63) Continuation of application No. 10/045,769, filed on Nov. 7, 2001, now Pat. No. 6,938,077.

(51) Int. Cl.
*G06F 13/00* (2006.01)
(52) U.S. Cl. .................. 709/228; 709/219; 709/229
(58) Field of Classification Search ............. 709/217, 709/219, 227, 228; 719/328, 329
See application file for complete search history.

(56) References Cited

U.S. PATENT DOCUMENTS

| 6,037,935 A | * | 3/2000 | Bates et al. .................. 715/760 |
| 6,477,550 B1 | * | 11/2002 | Balasubramaniam et al. ........................ 715/513 |
| 7,039,722 B1 | * | 5/2006 | Fuisz et al. .................. 709/246 |
| 2002/0103933 A1 | * | 8/2002 | Garon et al. ................. 709/246 |
| 2006/0031397 A1 | | 2/2006 | Sanders ....................... 709/203 |

* cited by examiner

*Primary Examiner*—Viet D. Vu
(74) *Attorney, Agent, or Firm*—Workman Nydegger (57) ABSTRACT

Override client version properties are used to selectively replace default client version properties of a web browser to obtain versions of web resources that are operational on the web browser. A client operating the web browser issues a request for content through a proxy server. Using an index, the proxy server determines whether the content is to be requested using an override client version property set. If so, the override client version property set is used to request the content form the web server and causes the web server to respond with content that has been designed or optimized for a web server other than the one operating on the client. Accordingly, the client can obtain fully functional and operational versions of the web resources using client version properties that are selected based on the capabilities of the web browser and the functionality available in different versions of individual web resources.

20 Claims, 4 Drawing Sheets

CLIENT VERSION ADVERTISEMENT SERVICE FOR OVERRIDING DEFAULT CLIENT VERSION PROPERTIES

CROSS-REFERENCE TO RELATED APPLICATIONS

This application is a continuation of U.S. application Ser. No. 10/045,769, filed Nov. 7, 2001, entitled "CLIENT ADVERTISEMENT SERVICE FOR OVERRIDING DEFAULT CLIENT VERSION PROPERTIES," which issued as U.S. Pat. No. 6,938,077 on Aug. 30, 2005, and which is incorporated here by reference in its entirety.

BACKGROUND OF THE INVENTION

1. The Field of the Invention

The present invention relates to the field of web browsers. More particularly, the present invention relates to a web browser's ability to specify client version properties or other information relating to the capabilities of the browser such that appropriate content is provided to the web browser and can be rendered as appropriately as possible.

2. Background and Related Art

Modern computer technology can provide a computer user with information at very high speeds. Many computers intended for interaction with a human operator also have built-in communications functionality. The communications functionality allows the computer to communicate and retrieve information from other computers. Computer networks provide a forum for multiple computers to communicate with each other. This allows the computer user to not only have access to high-speed information, but also vast amounts of information. The Internet is a very large network with connections to billions of computers. Computers on a network that access information are often referred to as clients, whereas computers that provide information to such clients are often referred to as servers. A client that accesses information from a server over the Internet can obtain information including content that is displayed or otherwise presented to the user, executable code that is executed on the client, or both.

Once information on a server has been accessed, the client must have a suitable software program configured to interpret the information. Often, the interpreted information is then displayed or otherwise provided to the user. Servers must also provide the information in a certain format so that the interpreter program on the client can appropriately interpret the information. These requirements have resulted in several semi-standardized computer languages or data formats intended for use with large networks such as the Internet, including HTML, XML, and Java. These languages are somewhat dynamic as demands for alternate ways to deliver and display network information proliferate. The growth of the languages is limited, however, by the interpretive programs.

The interpretive programs are generally known as web browsers. There are currently two major web browser lines that make up most of the web browser market, namely, Microsoft Internet Explorer developed by Microsoft Corporation and Netscape Navigator developed by Netscape Communications Corporation. In addition, there are several other web browsers available. Within each web browser line are different browser versions that have different functionality. The functionality of web browsers relates to the types of content and code of Internet documents that can be processed and executed by the web browsers.

Typically, a newer browser version incorporates the functionality of older versions, as well as adds new functionality. So, for instance, Internet Explorer version 5.0 incorporates the functionality of Internet Explorer 4.0 as well as some additional features. In addition, different lines of web browsers may have different functionality. One notable example of such different functionality is the difference in the way Microsoft Internet Explorer and Netscape Navigator perform the function that determines the resolutions at which graphics are displayed.

As new features of the languages and data format used in Internet documents are developed, many web browsers are updated to support such features. Likewise, as new web browser versions with new functionality are developed and released, Internet content providers can then use the corresponding enhancements of the languages and data formats, with the expectation that the enhancements will be compatible with many web browsers. Thus, developments in the functionality available on the Internet generally has required the cooperation of web browser developers and the developers of the Internet languages and data formats.

Of course, when new Internet functionality becomes available, many of those who access the Internet continue to use legacy web browsers that do not support the new functionality. When a web browser encounters code or data that it cannot process, the code or data is typically ignored. Understandably, this presents a challenge to Internet content providers that desire to make their information, with a maximum amount of functionality, available to as many clients as possible. Due to the large market share of Internet Explorer and Netscape Navigator, the functionality supported by these web browser lines has typically been a controlling factor as to the acceptance of new Internet functionality by Internet content providers.

One solution for ensuring information compatibility involves communication from the client to the server of version information regarding the web browser when the client requests information over the Internet. This is typically done by including a User-Agent Hypertext Transfer Protocol (HTTP) header in a request sent to the server. The User-Agent header is a data structure that enables the server to select content that is appropriate for specified browser versions and capabilities. This allows the server to provide the client with information that is compatible with the web browser running on the client. One problem with this solution is that with the multiple lines of web browsers, and the multiple versions within those lines, servers need to have a large number of different versions of information corresponding to the processing capabilities of the different versions of web browsers. Most servers that offer different versions of content only offer fully functional content for at most a few versions of the Microsoft Internet Explorer and Netscape Navigator browsers.

In order to operate in this environment, less common web browsers can receive web content by informing servers that they can process content that has been designed for specific versions of the most common web browsers. For example, a certain version of a less common web browser could inform servers that it has the capabilities of a specified version of Microsoft Internet Explorer and/or Netscape Navigator. In this situation, the server responds to the request for content as if the browser were actually the specified version of Microsoft Internet Explorer or Netscape Navigator.

This approach is suitable when the version of the less common web browser has all the processing capabilities of the latest versions of Internet Explorer and Netscape Navigator. However, the capabilities of a version of a less common web browser operating on a given client often do not completely coincide with those of Internet Explorer and Netscape Navigator. In this situation, the less common web browser is faced with one of two options for requesting content. First, the browser could inform servers that it is compatible with an older version of one of the most common browsers. In this situation, however, some servers may refuse to provide content to the client or may provide content with reduced functionality, even if the web browser were, in fact, compatible with the most advanced functionality of the requested content. In the alternative, the browser could inform servers that it is compatible with the most recent versions of the most common browsers. In this situation, however, there is a risk that the content that is received cannot be processed by the client. In view of the foregoing, there is no suitable conventional technique for clients having less common browsers to request the appropriate content from servers.

BRIEF SUMMARY OF THE INVENTION

The present invention relates to dynamically selecting and generating version information that describes the client which is used to request content having the appropriate functionality from web servers. This technique is particularly suited for less common browsers, and enables such browsers to access appropriate content that has been designed to operate on specific versions of the most common browsers. In this manner, the less common browser is not limited to a static User-Agent header that is used for all servers, World Wide Web ("web") sites, and web content. Instead, the User-Agent header and other information related to the capabilities of the client capabilities are selected so as to enable the client to access the most feature-rich content that is compatible with the web browser of the client. Moreover, the dynamic information specifying the capabilities of the client avoids the situations described above, in which a static User-Agent header often results in servers either refusing to provide access to content, providing content having reduced functionality, or providing content that has functionality that is not supported by the client.

In one implementation of the invention, an index of web resource addresses is used to enable a web browser to download the most feature rich content available for that particular web browser. Each web resource address has a set of corresponding override client version properties that have been determined to be appropriate for the content at the web resource address. The override client version properties are a combination of a User-Agent header and/or other information about the capabilities of the client. The User-Agent header enables the server associated with the web resource to provide an appropriate version of the web resource. The User-Agent header along with other override client version properties are exposed by the client to client-side script to allow these override client version properties to additionally influence any client-side processing. For instance, if it has been determined that the web browser operating on the client is capable of processing content on a first server that has been designed for the most recent versions of the most common web browsers (i.e., the most feature-rich content), the override client version properties associated with the first server would be the client version properties that corresponds to those of the most recent versions of the most common web browsers. Thus, when the client requests content from the first server, the client version properties used in the request are the override client version properties that cause the first server to transmit the most feature-rich content to the client.

Likewise, if it has been determined that the web browser operating on the client is not capable of processing the most feature-rich content of a second server, but is instead only capable of processing content that has been designed for a specific older version of the most common web browsers (i.e., less feature-rich content), the override client version properties associated with the second server would be the client version properties that correspond to those of the specific older version of the most common web browsers. Thus, when the client requests content from the second server, the client version properties used in the request are the override client version properties that cause the second server to transmit the less feature-rich content to the client.

In each of the foregoing examples, the client uses client version properties that have been determined to be appropriate for the particular content that is being requested. This is in contrast with conventional approaches, which use a static User-Agent header and static version properties to request content from servers. In this way, legacy versions of browsers, particularly of browsers that are not the most common, can be used to access appropriate versions of content from servers. The index of web resource addresses and corresponding override client version properties can be implemented at individual clients or can be implemented in systems having proxy servers through which clients gain access to web servers.

Other aspects of the invention relate to generating and maintaining the index of web resource addresses and corresponding override client version properties. The index can be generated by using client version properties from commonly used web browsers to systematically determine which client version properties, when used as overrides, allow a client computer running a particular web browser to download the most feature-rich content while minimizing content code/web browser incompatibilities. Accordingly, each set of client version properties corresponding to commonly used web browsers is supplied in separate requests by a computer to a web server containing a specific web page. That computer can then analyze the responses, monitor them for incompatibilities with the target web browser, and then select the most appropriate set of version properties for inclusion in an override version property index. The content is then monitored for incompatibilities with the particular web browser running on the computer. After all of the version properties from the list have been utilized to download the web page, the version properties that provide the most feature rich content are associated with the particular web page. That association is then made a part of an override version property index.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to both systems and methods for overriding default version properties of a web browser operating on a client. The User-Agent headers and/or other information that specify the version and capabilities of a browser provided to servers as part of requests for content can be tailored to the specific servers and the content that has been requested. In this manner, various versions of less common browsers can reliably access appropriate content that has been designed to operate with certain versions of the most common browsers.

As used herein, the term "most common browsers" refers to one or more lines of web browsers and the various versions of such lines of browsers for which content of a server is designed or optimized. Currently, the most common browsers are typically Microsoft Internet Explorer and Netscape Navigator, although the identity of the most common browsers can change over time and can vary among web servers. As used herein, the term "less common browser" refers to a browser that, for a particular server, is not a "most common browser" or, in other words, is not one of the browsers for which the content of the particular server has been designed or optimized. The embodiments of the present invention may comprise a special purpose or general purpose computer including various computer hardware, as discussed in greater detail below. Set top boxes that enhance the capabilities of conventional televisions represent an example of a special purpose computer. The embodiments may further comprise multiple computers linked in a networked environment.

As used herein, the term "client version properties" extends to any information included in a request for information from a server or is used to execute a client-side script that specifies the capabilities of the browser as they relate to a version of the information that is to be processed on the web browser in response to the request.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The invention will be described in the general context of computer-executable instructions, such as program modules, being executed by set-top boxes or other computers. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

I. Overriding Default Client Version Properties

Figure 1:
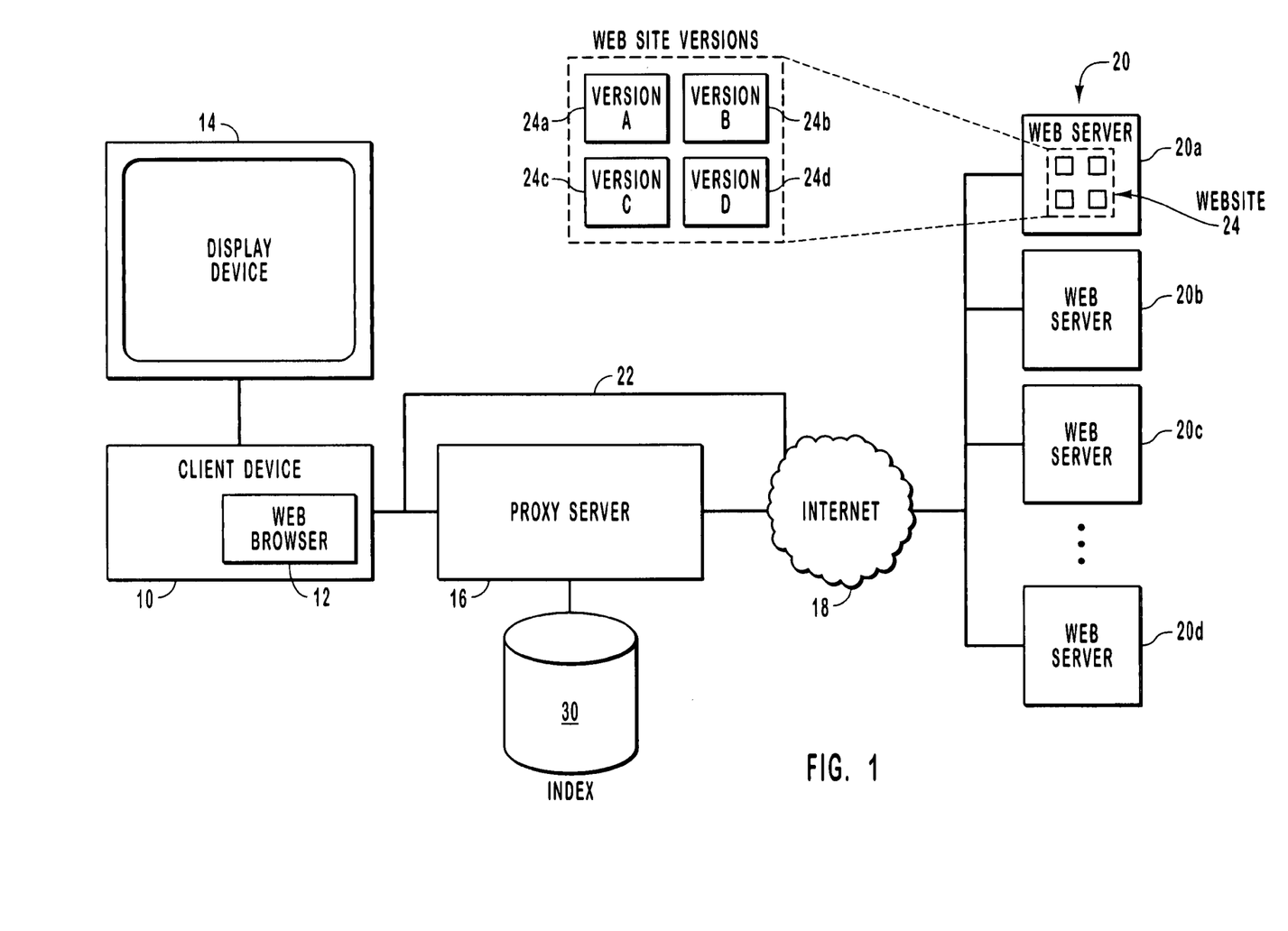
FIG. 1 illustrates an exemplary system that provides a suitable network environment for the present invention.

FIG. 1 illustrates one example of a network environment in which the present invention can be practiced. In FIG. 1, a client device 10, which may be a personal computer, an Internet appliance, a television set-top box having Internet browsing capabilities, or any other suitable processing device, operates a web browser 12 that enables a user to access web content on display device 14. In this example, it is assumed that client device 10 operates a less common browser for which content of web servers 20a–n has not been specifically optimized or designed.

The network illustrated by FIG. 1 further includes a proxy server 16 and a plurality of web servers 20. Proxy server 16 operates as an intermediary between the client device 10 and the web servers 20. Proxy server 16 allows other computer devices like the client device 10 to connect to the Internet 18 via the proxy server's 16 Internet connection. In one embodiment, the client device 10 requests a web page from the proxy server 16. The proxy server 16, using its Internet connection, retrieves the requested web page and delivers it to the client device 10. Typically, the proxy server 16 is located in relatively close proximity to the client device 10 in terms of the number of "hops" between the client device and the proxy server. In one embodiment, the proxy server 16 is one proxy server of a network of proxy servers, wherein each of the proxy servers is in relatively close proximity to its clients. In addition to accessing web content using proxy server 16, client device 10 can bypass the proxy server as shown at reference number 22 and access the Internet 18 directly as will be discussed in greater detail below. While FIG. 1 illustrates a proxy server 16, the invention can be practiced in networks in which no proxy server is present and the client device accesses servers 20 directly.

Generally, the web servers 20 are configured to deliver information readable by web browsers operating on client devices 10. The content on the web server 20 is generally formatted as one or more web sites 24. A web site 24 typically comprises a hypertext document with links to other documents on the web site 24 or to other web sites. The other documents may also have links to documents on the web site 24 or to other web sites. Web sites 24 represent examples of "web resources", which is to be interpreted broadly in the context of this description and the claims, and includes any document or other data that can be accessed using the Internet and processed using a web browser.

As shown in FIG. 1, a particular web site on a web server 20 can have multiple versions 24*a–d*, each being designed and optimized for display on a particular web browser version. Each web site version 24*a–d* may differ in formatting, functionality, and content, depending on the corresponding capabilities of the web browsers by which the web site version is intended to be processed and displayed. The primary method that web servers 20 use to determine what version of content to deliver to a device, such as a client device 10, involves receiving a "User-Agent" header that identifies the client version of the web browser 12 running on the client device 10.

Alternatively, rather than storing multiple versions of the web site, the web server can store a single version containing embedded, executable client-side script that is used by clients to modify the web page or resource for display on the browser. In this case, the web resource and the client-side script are transmitted to the client device 10 in response to the request for the web resource. The client device 10 then executes the script based on client version properties advertised by the device in exposed scripting properties. In either of the foregoing cases, a version of a web resource is selected and obtained using override client version properties associated with the client device 10.

The most common way that client-side script embedded in the web page returned by a server can be customized to provide appropriate content is by using the exposed client version properties. The most common of these properties is navigator.userAgent (which returns the same value as provided to the web server 20 in the User-Agent header), navigator.appVersion, and navigator.appName. Conventionally, these properties have been static and are a direct function of the web browser 12 version. According to the invention, however, the client version property set provided to a server 20 is selected dynamically in order to request content that has been determined to be compatible with web browser 12.

An example of a navigator.userAgent property is: Mozilla/4.0 (compatible; MSIE 4.0; Windows NT). This example of navigator.userAgent property is also an example of the information included in a User-Agent header. This navigator.userAgent property tells a web server 20 that the particular web browser is version 4.0 (note that Mozilla is a code word originally used by Netscape for their web browser that nearly all web browser providers now use and therefore, it no longer communicates any functional information), that the particular web browser is compatible with Microsoft Internet Explorer, and that the particular web browser is running on Windows NT. An example of a navigator.appVersion property is 4.0 (compatible; MSIE 4.0; Windows NT), which specifies a version of a web browser. An example of a navigator.appName is Microsoft Internet Explorer, which specifies a name of a web browser.

Web servers 20 that provide alternate versions of web site content usually have content that is optimized for only a few of the most common web browser versions. If the client device trying to access the web server 20 uses the conventional technique of providing a static User-Agent header and, therefore, does not indicate that it is capable of processing one of the supported version properties, the client device may either be returned content with less functionality that could actually be supported by the web browser, or may be denied access to the content regardless of whether the web browser on the client device supports the functionality of the content disposed on the web server 20.

Although the reasons for using proxy servers vary from network to network, some advantages of proxy servers are described below. It is noted that the invention is capable of implementation in networks having other proxy servers or no proxy servers at all. One advantage to using the proxy server 16 according to one embodiment is illustrated when the proxy server 16 acts as an intermediary for multiple client devices 10. The proxy server 16 has the ability to retrieve content from the web servers 20. In the case where certain content is requested by many client devices that operate with proxy server 16, the proxy server may cache the content locally. In a typical embodiment, the proxy server 16 is in close proximity on the network to client device 10 as well as being connected to the client device 10 with relatively few network links. In this way, each client device 10 that wishes to access the content is not required to retrieve the data through a complex series of network connections that, although not illustrated here, exist in modern WAN and Internet networks. By the proxy server 16 periodically retrieving the popular content and storing it locally, download time can be reduced for client devices 10 when they connect to the proxy server 16.

In one embodiment, to implement the web page caching feature, the web browsers running on all the client devices connected to a particular proxy server 16 must be similar. In this embodiment, the proxy server 16 only caches a single version of a particular web page and is therefore only able to deliver optimized content for a single web browser version property set.

In a second embodiment, multiple proxy servers 16 may service a particular set of client devices 10 that are running different web browser versions. In this way, each client device 10 that runs a web browser 12 with a different set of version properties connects to a correspondingly different proxy server 16. In this embodiment, multiple sets of version properties are supported, but each proxy server 16 only needs to support a single version property set.

In a third embodiment, a proxy server 16 is configured such that multiple versions of the same web page can be cached on the proxy server 16. In this embodiment, the proxy server 16 comprises means to detect the version properties of the client device 10 so as to provide the correct version of the web page.

Another advantage to using a proxy server 16 is illustrated in the situation where the client device 10 subscribes to a service that allows the client device 10 to connect to the proxy server 16. In this embodiment, the client devices 10 that are authorized to connect to the proxy server 16 are all pre-configured with a similar web browser 12. The web browser 12 can be updated periodically by the proxy server 16 as needed.

In addition to authorization to connect to the proxy server 16, the subscription also can include automated, as well as personal customer support. Using the customer support feature, a user can report problems such as difficulty when trying to download certain content. When all of the client devices 10 have a similar configuration, one user reporting a service problem may facilitate an update to the web browser 12 on all subscribers' client devices 10. Alternatively, if the service problem can be resolved by downloading alternate content that is available from the web servers 20, the proxy server 16 can ensure that the content is compatible with the client device 10 by downloading the alternate content.

In accordance with one embodiment of the present invention, the proxy server 16 maintains an index 30 of web resources and corresponding override client version properties. The index of override client version properties represents an example of a data structure that correlates addresses or identifiers of selected web resources or web sites with override client version properties that are to be used by web browser 12 to access the web resources or web sites. The web resources referenced by index 30 include web resources that, when accessed without the help of the proxy server 16, would result in the client device 10 receiving a version of the web resource having reduced functionality or would result in the web server refusing to provide the content of the web resource to the client device based on the default version property set associated with web browser 12.

The index 30 includes an override client version property set for each of the web resources included in the index. The override client version properties are those that have been selected to enable the client device to obtain content that is suitable to be processed by web browser 12. If a client device 10 tries to connect to one of the indexed web resources, the proxy server 16 overrides the default version properties with a set of version properties known to the web server 20, such that the web server 20 delivers to the client device 10 content with full functionality. Alternatively, the proxy server 16 provides a version property set to the client device 10 that can be used by the client device 10 to access a web resource directly while being able to download fully functional content. In this manner, less common web browsers operating on client device 10 can access appropriate content from servers 20 and can do so in a dynamic way that is tailored for the particular web browser and the particular content of the servers.

Figure 2:
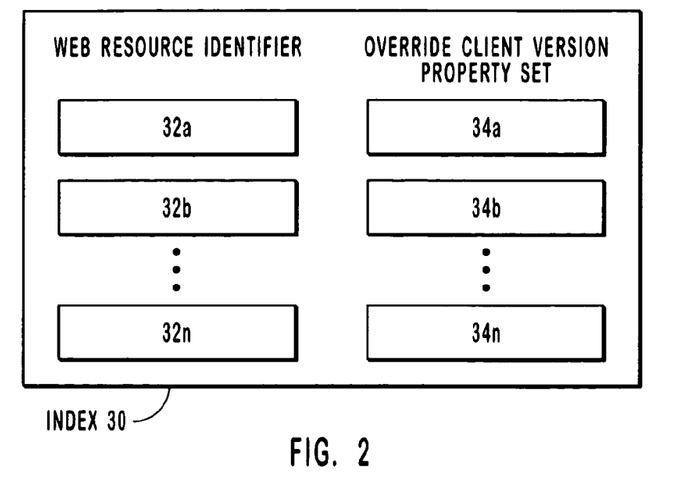
FIG. 2 illustrates a data structure that represents an index of override client version properties.

FIG. 2 illustrates the fields of a data structure that can be used as index 30, which may be maintained, for example, in a database, a text file, or another file. Because the entries in index 30 are used to provide override client version properties, an index is typically used for a single version of web browsers. In order to provide the appropriate override client version properties, the index 30 generally is created in the context of the particular capabilities of one version of a particular web browser.

In the example of FIG. 2, index 30 includes a set of web resource identifiers 32, which can be Uniform Resource Identifiers, or the addresses by which the web resources referenced by index can be obtained. The web resource identifiers can be the full network address from which a single web resource can be obtained or can be identifiers that relate to a group or set of web resources using wildcards or other such mechanisms. Although the nature of the identifiers and any wildcard system used in the index is not critical to the invention, the following is one example that illustrates the manner in which web resource identifiers can be included in an index:

1) http://www.uspto.gov/index.htm—This and only this resource is associated with a specified override client version property set.
2) http://www.uspto.gov/subdir/*—All resources contained in subdir are associated with a specified override client version property set.
3) www.uspto.gov—All resources hosted by www.uspto.gov are associated with a specified override client version property set.

For each indexed web resource, the index 30 further includes an override client version property set 34 that has been determined to be effective for obtaining an appropriate version of the content of the web resource for the particular version of web browser.

For instance, it may have been determined for a particular web resource that the web browser for which index 30 has been created (e.g., web browser 12 of FIG. 1) will receive content having the greatest degree of operational functionality when using a client version property set identical to the client version property set of the most recent version of Microsoft Internet Explorer. In this example, the override client version property set 34 included in the index 30 for this particular web resource can be one that is identical to the client version property set of the most recent version of Microsoft Internet Explorer. In this manner, when this particular override client version property set 34 is used to obtain content for web browser 12, the web server provides content that has been designed or optimized for use by the most recent version of Microsoft Internet Explorer. Thus, the web browser 12 gains access to the appropriate version of content.

Similarly, if it has been determined that web browser 12 is only capable of processing a version of content of another web resource that has been designed or optimized for processing using an older version of Microsoft Internet Explorer, the override client version property set 34 for that web resource is one that corresponds to the client version property set of the older version of Microsoft Internet Explorer. Again, it is pointed out that these override client version properties 34 are particularly useful when the web browser is not one of the most common web browsers. In such instances, less common web browsers can use override client version properties 34 that are otherwise associated with certain versions of the most common web browsers to gain access to an appropriate version of content of particular web sites or web resources.

Although index 30 of FIG. 2 has been described as being used for a single version of a particular less common web browser, the indices of the invention can be adapted for use by various versions of web browsers. For example, index 30 can be supplemented with a set of potentially different override client version properties 34 for each of the indexed web resource identifiers 32. Index 30 then provides the appropriate override client version properties from among the set of override client version properties based on the version of the web browser 12 that is being used by the client device. In an alternate embodiment, proxy server 16 can have a set of separate indices, each one being created for different versions of web browsers.

Returning now to FIG. 1, in certain situations, it is necessary for the client device 10 to know the version property set when interacting with a web server 20. Some web sites 24 contain script, or small segments of computer code, that require clients to provide to them information such as a version properties. If the proxy server 16 has selected a set of override version properties in order to retrieve the web resource in the first instance, but has not provided the client device 10 with the version properties, client device 10 may not be able to present fully functional content if these properties are required by client-side script. However, one capability of the present invention is to provide the client device 10 with the override version property set for use when the web site 24 runs such scripts.

If the web resource requested by the client device 10 is not included in the index 30, the client device 10 is allowed to access the requested web resource using the web browser 12 default version properties. Additionally, the client device 10 can be configured such that if the web resource is not on the index, the client device 10 no longer uses the proxy server 16 to check other pages associated with the same web resource, thereby allowing the client device 10 to access the subsequent pages directly. The period for not checking the index 30 can be a specific length of time, can be reset each time the client device 10 connected to the Internet (i.e. each session), or any can be other appropriate time period.

One problem with using a proxy server 16 arises in the context of secure connections. Some web sites allow a client to connect to the server in a secure way such that confidential information can be passed across the Internet under conditions where the risk of interception has been reduced. The secure connections typically do not support situations such as the proxy caching described above. One technique according to the present invention that allows a client device 10 to connect to secure web pages on a web server 20 is through the use of a server that is referred to herein as a "check-url" server. In the context of FIG. 1, this embodiment using a check-url server can be implemented in any of various ways. For example, proxy server 16 can itself be a check-url server or can be supplemented with the functionality of a check-url server. Alternatively, a separate check-url server can be used in series with proxy server 16 or in combination with proxy server 16.

Check-url servers were originally designed as a parental Internet content control device. Such check-url servers maintain a list of restricted web sites. Prior to accessing any web sites, restricted or otherwise, on the Internet, a client computer using the check-url server for content control accesses the check-url server to determine if a requested web site is listed. If the web site is listed, the client computer would be returned access restrictions associated with the site. In accordance with one embodiment of the present invention, a check-url server is adapted to provide override client version properties in addition to or instead of providing Internet content control services. The check-url server, according to this embodiment of the invention, houses a database or a file containing a list of web sites and version properties as described above in the proxy server 16 context. In the case of the check-url embodiment, the check-url server provides the override version property set to the client, such as a client device 10. Using the override version property set, the web browser 12 running on the client device 10 can directly access web pages, including those with secure connections.

As an alternative to the index being disposed on the proxy server 16 or a check-url server, the index can be disposed on the client device 10 and updated by the proxy server 16 or by any other appropriate means.

Figure 3:
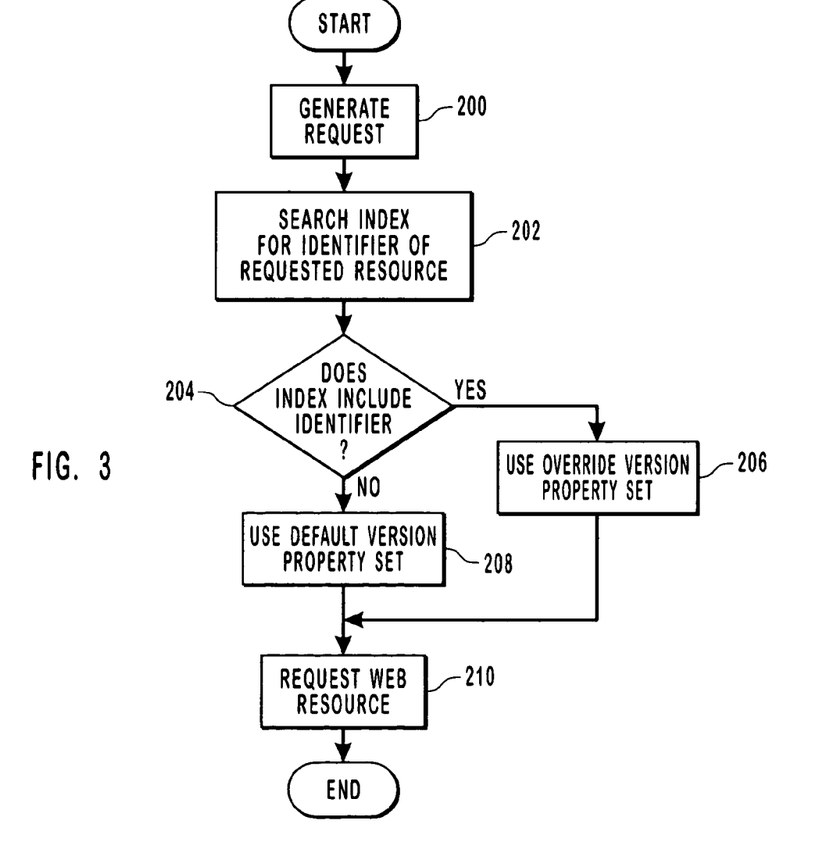
FIG. 3 is a flow diagram illustrating a typical process by which override version properties are used in downloading web content.

FIG. 3 illustrates a method by which a default client version property set is overridden to allow for maximum functionality when accessing a web resource. According to step 200, a client device and a web browser operating thereon are used to generate a request for a web resource. The request can be a conventional hypertext transfer protocol (HTTP) request using a URI associated with the requested web resource.

As described above, the request is initially processed to determine whether a client version property set associated with the request is to be modified to include override client version properties that will obtain appropriate content for the web browser. In step 202, the index of override client version properties is searched to determine whether the index references an identifier associated with the requested web resource. As noted above, the index can be stored and searched by a proxy server or the client device can directly use the index without the assistance of a proxy server.

If, according to decision block 204, the index does include an identifier of the requested web resource, the method proceeds to step 206, in which the override client version property set associated by the index with the identifier of the requested web resource is used as a replacement or a substitute for the default client version property set of the web browser. The method then proceeds to step 210, in which the override client version property set is used to request the requested web resource. In this manner, the web server that receives the request responds thereto as if the web browser that issued the request were the web browser for which the requested content was designed or optimized. Thus, the requesting web browser is able to receive content having functionality that has been determined to be operational.

If, in contrast, the index does not include the identifier associated with the requested web resource, the method then proceeds from decision block 204 to step 206, in which the default client version property set is used to request the web resource. Situations in which the requested resource is not included in the index include those in it has been determined that the default client version property set results in the appropriate content being received by the web browser and also those in which the requested web resource has not been considered during the process of creating the index.

In view of the foregoing, it can be understood that the index and the associated override client version properties can be used to tailor each client version property set for particular web resources. In other words, this method can be used to optimize the content received by a particular version of a less common web browser for individual web resources. Thus, if the web browser has the capability of processing the most advanced and full version of a particular web resource, the override client version property set is selected to cause the web server associated with the particular web resource to transmit the most advanced and full version thereof. If the web browser has only the capability of processing a version of another web resource having less than the full and most advanced content, the override client version property set in this situation is selected to cause the web server to transmit the version having less than the full and most advanced content.

Figure 4:
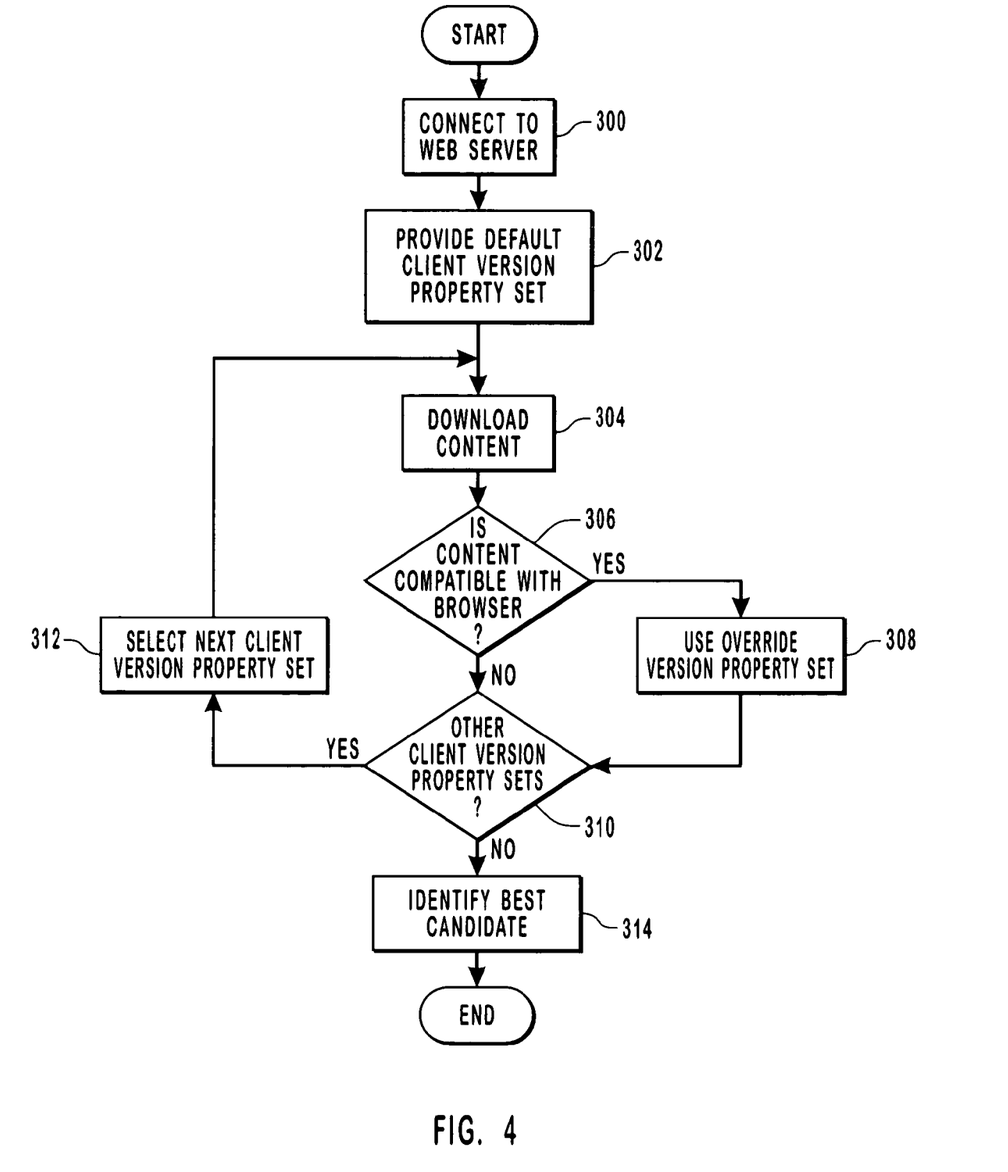
FIG. 4 is a flow diagram illustrating a typical process by which an override version property index can be created.

Referring now to FIG. 4, a method for generating and updating an index of override version properties is illustrated. In general, the index is generated to include override client version properties that have been determined to cause the web server from which a particular web resource is requested to transmit an appropriate version of the requested web resource. The process of creating the index generally includes some analysis of the manner in which the web browser processes or fails to process the content of particular web resources. Based on this basic principle, the techniques by which an index is generated can vary widely depending on the needs of the entity that implements the invention.

In the example of FIG. 4, the process of obtaining an override client version property set for a particular web resource is initiated in response to a determination that the default client version property set is somehow insufficient for obtaining the optimal functionality that the web browser can process. For instance, an administrator of a network that includes a proxy server can test the web browser on various web resources or can respond to a report of a problem experienced by a user of one of the client devices that operate the web browser.

In step 300, a client device operating the web browser is connected to the web server and requests the particular web resource that is to be tested. As part of the request, the client device advertises its default client version property set in step 302. In step 304, the content is downloaded and the web browser attempts to process the content of the web resource.

If, according to decision block 306, the web browser is capable of fully processing the content of the web resource or, in other words, the content is compatible with the web browser, the client version property set that has been used to obtain the web resource is identified as being a candidate client version property set that is appropriate to be used to request the web resource as shown at step 308. In this first iteration, if the content is compatible with the web browser, the default client version property set is determined to be a candidate client version property set. If, according to decision block 306, the content that has been obtained using the default client version property set is not compatible with the browser, it is determined that the default client version property set is not a candidate.

In either case, the method advances to decision block 310, in which it is determined whether there are other client version properties to be tested. If decision block 310 is answered affirmatively, the method proceeds to step 312, in which the next client version property set is selected and is used to initiate a request to the web server for the content associated with the web resource. The next client version property set in step 312 can be, for example, a client version property set associated with the most recent or an older version of one of the most common web browsers. In this manner, the web browser can be tested with various versions of the web resource that have been designed or optimized to be used by different versions of the most common web browsers. This process enables the web browser to be tested for individual web resources to determine whether the web browser is compatible with the most advanced and full version of the web resource or whether it is capable of processing only an older version of the web resource.

Steps 314, 306, 308, 310, and 312 are repeated as needed to test a series of client version properties. When, according to decision block 310, there are no more client version properties to be tested, the method advances to step 314, in which the best candidate (e.g., the candidate obtains content that is more operational than other content) from among those client version properties that resulted in operational content is selected. The best candidate can be identified according to substantially any criteria, so long as the best candidate is one that obtains operational content for the web browser. If the best candidate is the default client version property set, it has been determined that the web browser is capable of obtaining appropriate content without requiring an override client version property set. If, however, the best candidate is a client version property set other than the default, the best candidate is designated as the override client version property set and an entry is added to the index to specify that the web browser, when requesting the particular web resource, is to use the override client version property set rather than the default client version property set. The entry added to the index can be similar to those described above in reference to FIG. 2.

II. Exemplary Operating Environment

The invention has been described above in the context of a client device that requests content of web resources using client version properties. A specific example of a suitable client device is described below in reference to FIG. 5. However, it is to be understood that the invention can be practiced with substantially any client devices that are capable of operating a web browser, including personal computers, dedicated Internet terminals, hand-held devices, set-top boxes, embedded devices, etc.

Figure 5:
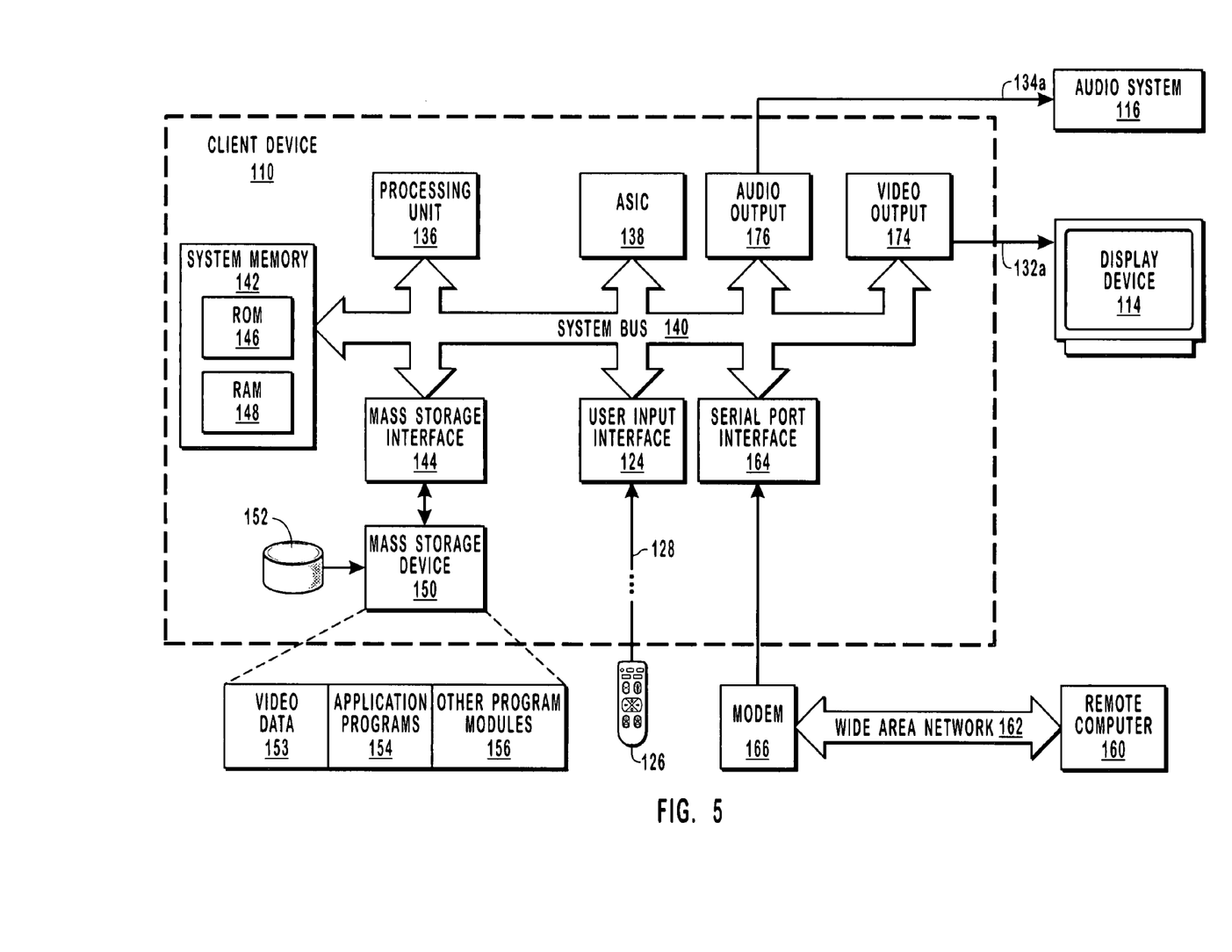
FIG. 5 illustrates one example of a client device that can be used to practice the invention.

In one embodiment, the present invention is implemented in a system that uses a conventional television screen or other display unit to display information and includes a set-top box or a similar Internet terminal that has been adapted to perform the operations of client devices that have been described herein. FIG. 5 illustrates a system that includes a client device 110, a display device 114 and an audio system 116. Client device 110 may be integrally positioned with or separate from display device 114, which may be a television display or a conventional computer monitor.

Client device 110 includes a user input interface 124, which receives input from an input device 126, such as a remote control, keyboard, microphone, or any other device capable of generating electronic instructions for client device 110. Input device 126 is communicatively coupled to client device 110 over an input link 128 so as to enable such control. Input device 126 is used to control the operation of the web browser that is executed by client device 110 by, for example, enabling the user to select hypertext links or otherwise issue HTTP requests.

The operation of client device 110 is controlled by a central processing unit ("CPU"), illustrated as processing unit 136, which is coupled to an application-specific integrated circuit ("ASIC") 138 and uses computer-executable instructions implemented in software and/or hardwired logic circuitry. Processing unit 136 and ASIC 138 are coupled via a system bus 140, which also interconnects various other system components, such as the system memory 142, mass storage interface 144, user input interface 124 and signal input 118. Processing unit 136 executes software designed to implement features of client device 110 including the web browsers discussed herein. ASIC 138 contains circuitry that is used to implement certain functions of client device 110. Instructions, data, and other software necessary for the operation of processing unit 136 and ASIC 138 may be stored in the system memory 142, such as in read-only memory ("ROM") 146 and/or in random-access memory ("RAM") 148, and/or in a mass storage device 150, which is coupled to mass storage interface 144. ROM 146, RAM 148 and mass storage device 150 are communicatively coupled to ASIC 138 so as to be readable by ASIC 138 and so that data may be written from ASIC 138 to RAM 148 and possibly mass storage device 150.

Mass storage device 150 may be a magnetic hard disk 152 or any other magnetic or optical mass memory device that is capable of storing large amounts of data. Any desired computer-readable instructions or data, including application programs 154, and other program modules 156. Application programs 154 include the web browser 12 described above in reference to FIG. 1.

Referring to FIG. 5, client device 110 communicates with a remote computer 160 via a wide area network ("WAN") 162 by including a serial port interface 164 that is interposed between the system bus 140 and a modem 166, a wireless link, or other means for establishing communications over a WAN that may be internal or external to client device 110. The remote computer 160 represents the source of content that is received by client device 110. Accordingly, remote computer 160 can represent proxy server 16 of FIG. 1, web server 20 of FIG. 1, a combination of proxy server 16 and web server 20, or any such computer or network system from which the client device receives content. Thus, as used in the claims, "remote computer" is to be interpreted broadly and includes any single computer, set of computers, or network from which the client device transmits requests and receives data and is not limited, unless otherwise specifically specified, to a single web server that provides content to a client device.

While FIG. 5 and the corresponding discussion above provide a general description of a suitable environment in which the invention may be implemented, it will be appreciated that the features of the present invention disclosed herein may be practiced in association with a variety of different system configurations.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system that provides access to web resources to be processed by a web browser and that is configured for implementing a method of selectively overriding a default client version property set of the web browser, the computer system comprising:
   one or more computer-readable storage media having computer-executable instructions for implementing the method of selectively overriding a default client version property set of the web browser, wherein the method comprises:
      receiving input that includes an address associated with a requested web resource;
      determining whether the address associated with the requested web resource corresponds with an identifier included in the data structure that correlates identifiers of selected web resources with override client version properties;
      if the address associated with the requested web resource corresponds with an identifier included in the data structure, obtaining the requested web resource using an override client version property set correlated by the data structure with the requested web resource; and
      if the address associated with the requested web resource does not correspond with an identifier included in the data structure, obtaining the requested web resource using the default client version property set of the web browser.

2. The computer system of claim 1, wherein the identifiers are uniform resource identifiers.

3. The computer system of claim 1, wherein the act of obtaining the requested web resource using the override version property set comprises the act of obtaining a version of the requested web resource that has been selected by a server from which the requested web resource was obtained.

4. The computer system of claim 1, wherein the act of obtaining the requested web resource using the override version property set comprises the acts of:
   obtaining the requested web resource and a client-side script from a server; and
   executing the client-side script so as to modify the requested web resource according to the override client version property set.

5. The computer system of claim 1, wherein the data structure is stored at a proxy server and the act of determining whether the address associated with the requested web resource corresponds with an identifier included in the data structure is conducted by the proxy server.

6. The computer system of claim 1, wherein the data structure is stored at a client device on which the web browser operates and the act of determining whether the address associated with the requested web resource corresponds with an identifier included in the data structure is conducted by the client device.

7. The method of claim 1, wherein the data structure is stored at a check-url server included in the computer system and the act of determining whether the address associated with the requested web resource corresponds with an identifier included in the data structure is conducted by the check-url server.

8. The computer system of claim 1, wherein the web resource is obtained from a web server, the method further comprising the act of requesting a subsequent web resource from the web server using the default client version property set.

9. The computer system of claim 1, wherein the act of obtaining the requested web resource using the override version property set is conducted such that content of the obtained web resource is different from content of the requested web resource that would have been obtained if the default client version property set would have been used.

10. The computer system of claim 1, wherein the act of obtaining the requested web resource using the override version property set is conducted and, if the default client version property set were instead to have been used, a version of the web resources having content that is not operational with the web browser would have been obtained.

11. The computer system of claim 1, wherein the act of obtaining the requested web resource using the override version property set is conducted and, if the default client version property set were instead to have been used, a web server from which the web resources were requested would have refused to provide the requested web resource.

12. A client device comprising one or more computer-readable storage media having computer executable instructions for implementing a method for generating an index for replacing default client version properties associated with web browsers with override client version properties when requests for web resources are made, wherein the method comprises:
   using a web browser operating on the client device to request a first version of a web resource from a web server using a default client version property set associated with the client device;
   using the web browser to request a version of the web resource from the web server using each of one or more other client version properties; and
   if:
      i) the version of the web resource requested using the default client version property set is not obtained or;
      ii) the version of the web resource requested using a particular other client version property set of the one or more other client version properties is more operational than the version of the web resource requested using the default property, then:
         designating said particular other client version property set as an override client version property set that is to be used when the web browser again requests the web resource from the web server.

13. The client device of claim 12, wherein the method further comprises adding an identifier of the web resource and the corresponding override client version property set to the index.

14. The client device of claim 13, wherein the method further comprises storing the index at a proxy server through which client devices operating the web browser request web resources.

15. The client device of claim 12, wherein the method further comprises, for each request, using either the default client version property set or the one or more other client version properties, and if the requested version of the web resource is obtained, determining whether the version of the web resource is operational.

16. The client device of claim 12, wherein the acts of using a web browser operating on a client device to request a first version of a web resource and using the web browser to request a version of the web resource from the web server using each of one or more other client version properties are conducted by an administrator of a proxy server in response to an indication by a user of a client device operating through the proxy server that the web resource is not fully functional using the web browser.

17. A computer program product for use in system that provides access to web resources to be processed by a web browser and that is configured for implementing a method of selectively overriding a default client version property set of the web browser, the computer program product comprising one or more computer-readable storage media having computer-executable instructions for implementing the method, wherein the method comprises:
  receiving input that includes an address associated with a requested web resource;
  determining whether the address associated with the requested web resource corresponds with an identifier included in the data structure that correlates identifiers of selected web resources with override client version properties;
  if the address associated with the requested web resource corresponds with an identifier included in the data structure, obtaining the requested web resource using an override client version property set correlated by the data structure with the requested web resource; and
  if the address associated with the requested web resource does not correspond with an identifier included in the data structure, obtaining the requested web resource using the default client version property set of the web browser.

18. The computer program product of claim 17, wherein the identifiers are uniform resource identifiers.

19. The computer program product of claim 17, wherein the act of obtaining the requested web resource using the override version property set comprises the act of obtaining a version of the requested web resource that has been selected by a server from which the requested web resource was obtained.

20. A computer program product comprising one or more computer-readable storage media having computer executable instructions for implementing a method for generating an index for replacing default client version properties associated with web browsers with override client version properties when requests for web resources are made, wherein the method comprises:
  using a web browser operating on a client device to request a first version of a web resource from a web server using a default client version property set associated with the client device;
  using the web browser to request a version of the web resource from the web server using each of one or more other client version properties; and
  if:
    i) the version of the web resource requested using the default client version property set is not obtained or;
    ii) the version of the web resource requested using a particular other client version property set of the one or more other client version properties is more operational than the version of the web resource requested using the default property, then:
      designating said particular other client version property set as an override client version property set that is to be used when the web browser again requests the web resource from the web server.

* * * * *